United States Patent [19]

Brannan

[11] 4,174,871
[45] Nov. 20, 1979

[54] MATERIAL HANDLING VEHICLE

[75] Inventor: John E. Brannan, Lake Zurich, Ill.

[73] Assignee: Ballbarrow Corporation, Itasca, Ill.

[21] Appl. No.: 866,381

[22] Filed: Jan. 3, 1978

[51] Int. Cl.$^2$ ............................................. F16C 33/20
[52] U.S. Cl. ........................................ 308/238; 301/7
[58] Field of Search .......................... 301/1, 5.3, 5.7, 7; 308/238–239, 237 A, DIG. 7; 152/7, 8, 352; 280/47.31, 47.3

[56] References Cited

U.S. PATENT DOCUMENTS

| 2,241,684 | 5/1941 | Ware | 301/5.3 |
| 2,418,396 | 4/1947 | Carr et al. | 301/1 |
| 3,250,556 | 5/1966 | Couch et al. | 308/238 |
| 3,424,503 | 1/1969 | Schulz | 308/238 |
| 4,058,344 | 11/1977 | Dyson | 301/7 |

FOREIGN PATENT DOCUMENTS 2302870 10/1976 France ............................ 301/7

Primary Examiner—H. Grant Skaggs
Attorney, Agent, or Firm—Richard G. Lione

[57] ABSTRACT

A stub axle assembly for mounting a vehicle body on a supporting member such as a molded plastic ball. The assembly includes a stub axle which seats within and is locked by a dimple and slot arrangement for rotation with an inner bushing of molded plastic. The inner bushing rotates within an outer bushing, also of molded plastic. The external configuration of the outer bushing is that of a tapered hexagon and it wedges in a correspondingly shaped receptacle in the ball wall.

2 Claims, 5 Drawing Figures

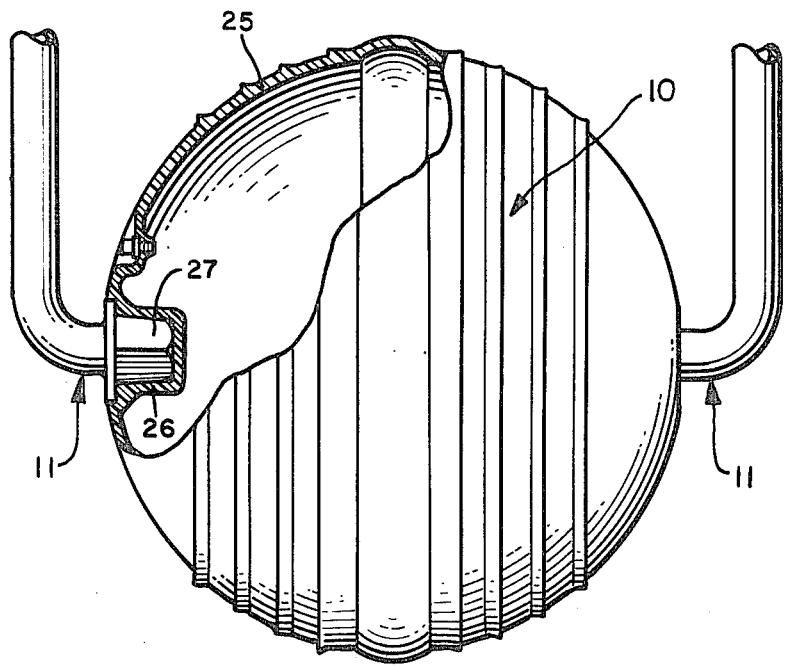
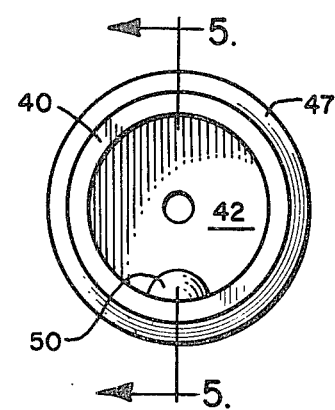
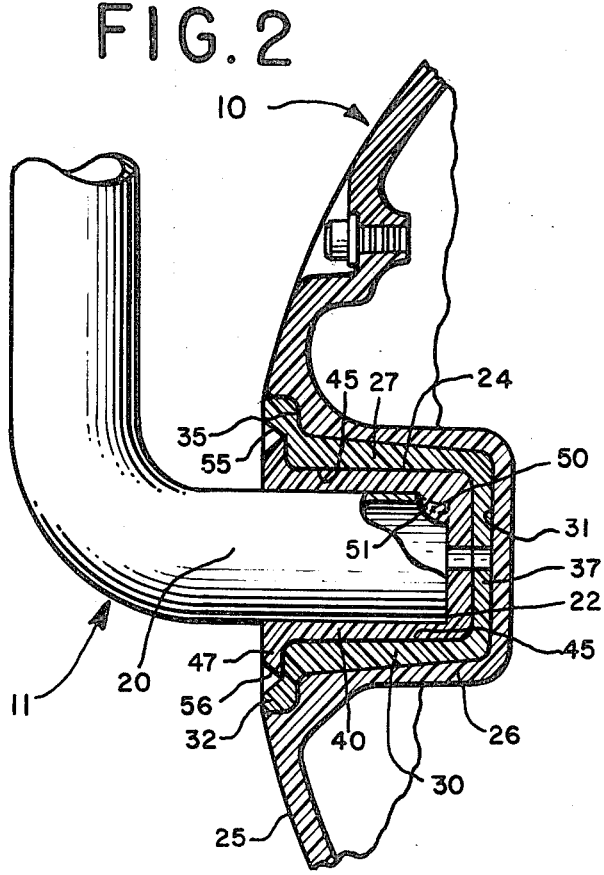
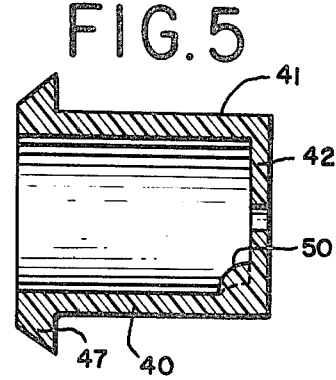
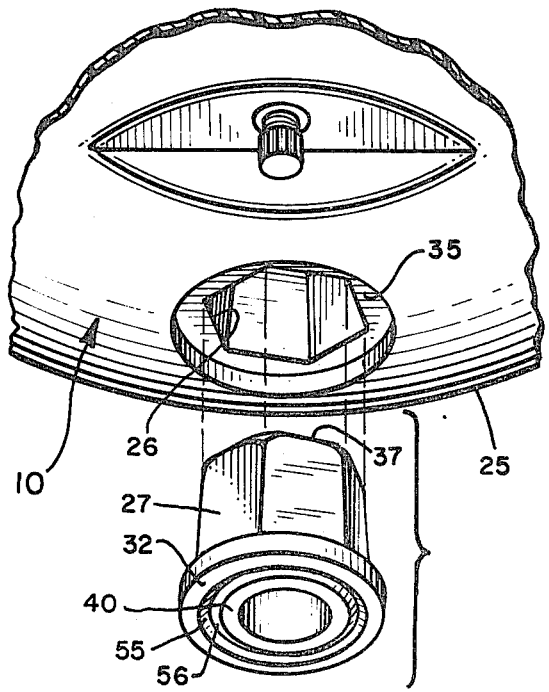

MATERIAL HANDLING VEHICLE

FIELD OF THE INVENTION

This invention relates to a stub axle assembly for a molded plastic ball used as a wheel substitute for supporting a load carrying vehicle, such as a hand cart or barrow or the like.

BACKGROUND OF THE INVENTION

In recent years load carrying vehicles using molded plastic balls in lieu of supporting wheels have become popular. One of these is the single wheeled, barrow type, all terrain vehicle manufactured and sold by Ballbarrow Corporation, Itasca, Ill., assignee of the present application.

Such load carrying vehicles support the barrow body through stub axle assemblies depending from the body. The stub axle assemblies are critical components of the vehicles because they form the interface between the body and the rotating ball.

SUMMARY OF THE INVENTION

The present invention is embodied in a new and improved stub axle assembly for mounting the load carrying body of a barrow or the like on a supporting ball.

Another object is to provide a stub axle assembly which more firmly mounts the load carrying body on a plastic ball, effectively resisting influences which would tend to cause it to become loose or come apart.

Still another object is to provide a stub axle assembly including a new and improved bushing sub-assembly.

DESCRIPTION OF THE DRAWINGS

The invention, including its construction and method of operation, together with additional objects and advantages thereof, is illustrated more or less diagrammatically in the drawings, in which:

FIG. 1 is a front elevational view of the ground engaging ball in a barrow type vehicle or the like, with stub axle assemblies embodying features of the invention (and parts removed);

FIG. 2 is an enlarged sectional view of one stub axle assembly illustrated in FIG. 1;

FIG. 3 is a perspective view of the bushing arrangement sub-assembly in the stub axle assemblies;

FIG. 4 is an end elevational view of the outer bushing; and

FIG. 5 is a sectional view taken along line 5—5 of FIG. 4.

DESCRIPTION OF THE PREFERRED EMBODIMENT

Referring now to the drawings, and particularly to FIG. 1, the single supporting ball 10 of the barrow type, all terrain vehicle is shown with a pair of stub axle assemblies 11 embodying features of the invention extending therefrom. The stub axle assemblies 11 support the body of the barrow (not shown) from the ball 10.

The stub axle assemblies 11 on opposite sides of the ball 10 are identical in construction and arrangement. Accordingly, only one assembly 11 is described in detail and corresponding reference numerals are applied to each.

Referring now to FIG. 2, each stub assembly 11 includes a stub axle defined by the horizontal section 20 of steel tube which terminates in a free end 22. The free end 22 seats in a bushing sub-assembly mounted in the plastic wall 25 of the ball 10.

Referring to FIG. 3 as well as to FIG. 2, the wall 25 of the ball 10 is molded to form a hexagonal cross section receptacle 26 for an outer bushing 27 of the bushing sub-assembly 24. The inner side walls 30 of the receptacle 26 taper slightly inwardly toward the receptacle bottom 31. The external configuration of the bushing 27 is identical to the internal configuration of the receptacle 26.

The outer bushing 27 is also molded of plastic. It has an annular shield 32 formed around its open end, opposite the bottom 31. The annular shield 32 is adapted to seat in a corrspondingly shaped recess 35 in the ball wall 25, as best illustrated in FIG. 2.

The dimensions of the bushing 27 are such that it is wedged snugly in the receptacle 26 as the shield 32 comes to rest in the recess 35. In this seated position, the bottom 37 of the bushing 27 is seated tightly against the bottom 31 of the receptacle 26.

Wedged in this manner, the bushing 27 is firmly fixed against rotation by cooperation between the hexagonal configurations of the side walls 30 in the receptacle 26 and the correspondingly shaped external configuration of the bushing 27. The wedged, interference fit also prevents the bushing 27 from readily coming out of the receptacle 26, even when the stub axle 20 is not in place.

FIG. 3 illustrates the outer bushing 27 about to be seated in the receptacle 26. It also shows the inner bushing 40 already seated in the outer bushing 27.

The inner bushing 40 is also molded in plastic, but has a uniformly cylindrical side wall 41, as best seen in FIGS. 4 and 5. This uniformly cylindrical side wall 41, which terminates in a flat bottom 42, has external dimensions only slightly smaller than the inside diameter of the correspondingly shaped cylindrical inner surface 45 in the outer bushing 27. As a result, the inner bushing 40 is adapted to rotate freely, but without lateral play, in the outer bushing 27. With the inner bushing 40 seated in the outer bushing 27, as again illustrated in FIG. 2, its annular shoulder 47 seats in recessed relationship within the confines of the annular shield 32 formed on the outer bushing 27.

As best illustrated in FIGS. 2, 4, and 5, the inner bushing 40 has an internal locking device for the stub axle 20 in the form of a segmentally spherical knuckle 50 which projects from the juncture of the side wall 41 and bottom 42 of the inner bushing. This knuckle 50 is adapted to locate in a longitudinally extending slot 51, of dimensions corresponding generally to those of the knuckle 50, formed in the stub axle 20 extending outwardly from its free end 22. Stub axle 20 slides freely into the inner bushing 40 in the manner illustrated in FIG. 2 and the bushing locates itself relative to the stub axle by the knuckle 50 seating in the slot 51. As the ball 10 rolls on the terrain in support of the barrow body, the inner bushing 40 then rotates relative to the outer bushing 27 on their complimentary plastic surfaces, the inner bushing being locked in rotation with the stub axle by the knuckle 50 and slot 51 relationship.

Still referring to FIG. 2, it will be seen that the annular shield 32 on the outer bushing 27 has a frusto-conical surface 55 extending around its interior. The shoulder 47 on the inner bushing 40 has an oppositely configured frusto-conical surface 56 formed on its external periphery and the two surfaces 55 and 56 meet at the annular periphery of the shoulder 47. This arrangement helps to prevent dust from getting in between the bearings 27 and 40 and, eventually, scoring them.

While the embodiment described herein is at present considered to be preferred, it is understood that various modifications and improvements may be made therein, and it is intended to cover in the appended claims all such modifications and improvements as fall within the true spirit and scope of the invention.

What is desired to be claimed and secured by Letters Patent of the United States is:

1. A stub axle assembly for mounting a vehicle body on a supporting member, comprising:
   a. a horizontally disposed stub axle,
   b. a closed and flat bottom receptacle formed in a molded plastic side of said supporting member and having polygonal cross-section side walls between the open end of the receptacle and its bottom, and
   c. a bushing sub-assembly seated in said receptacle,
   d. said bushing sub-assembly including a molded plastic outer bushing having a flat bottom and an outer surface with a polygonal cross-section whereby when the outer bushing is seated in the receptacle it cannot rotate.
   e. the bottom of said outer bushing resting against the bottom of said receptacle when the outer bushing is seated.
   f. said bushing sub-assembly further including a molded plastic inner bushing having a cylindrical side wall and seated within said outer bushing,
   g. said inner bushing having a flat bottom which rests against and rotates on the bottom of said outer bushing,
   h. said stub axle being seated in said inner bushing and having means thereon for locking it to said inner bushing so that said outer bushing and said supporting member rotate together relative to said inner bushing and said stub axle,
   i. said outer bushing having an annular shield formed around its open end opposite its bottom and seated in a recess in the side of said supporting member, and
   j. said inner bushing having an annular shoulder formed around its open end which is seated freely within the confines of and against said annular shield on said outer bushing.

2. A stub axle assembly for mounting a vehicle body on a supporting member, comprising:
   a. a horizontally disposed stub axle,
   b. a closed bottom receptacle formed in a molded plastic side of said supporting member and having polygonal cross-section side walls between the open end of the receptacle and its closed bottom, and
   c. a bushing sub-assembly seated in said receptacle,
   d. said bushing sub-assembly including a molded plastic outer bushing having a bottom and and outer surface with a polygonal cross-section whereby when the outer bushing is seated in the receptacle it cannot rotate.
   e. the bottom of said outer bushing being adjacent the bottom of said receptacle when the outer bushing is seated,
   f. said bushing sub-assembly further including a molded plastic inner bushing having a cylindrical side wall and seated within said outer bushing,
   g. said inner bushing having a bottom which is adjacent the bottom of said outer bushing when the inner bushing is seated,
   h. said stub axle being seated in said inner bushing and having means thereon for locking it to said inner bushing so that said outer bushing and said supporting member rotate together relative to said inner bushing and said stub axle,
   i. said outer bushing having an annular shield formed around its open end opposite its bottom,
   j. said inner bushing having an annular shoulder formed around its open end which is seated within the confines of and against said annular shield on said outer bushing,
   k. said annular shield having a frusto-conical surface formed therearound facing inwardly toward said annular shoulder,
   l. said annular shoulder having a frusto-conical surface formed therearound facing outwardly toward said frusto-conical surface on said annular shield.

* * * * *